Nov. 28, 1939.  J. A. PURVIS  2,181,588
SERVICE MANUAL OR GUIDE
Filed July 6, 1937  2 Sheets-Sheet 1
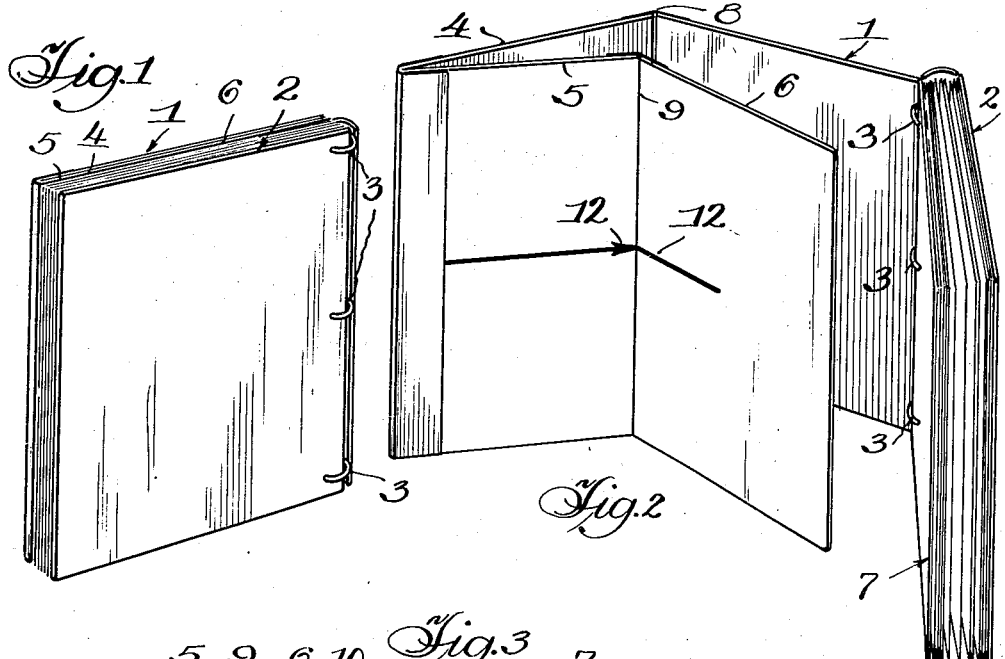
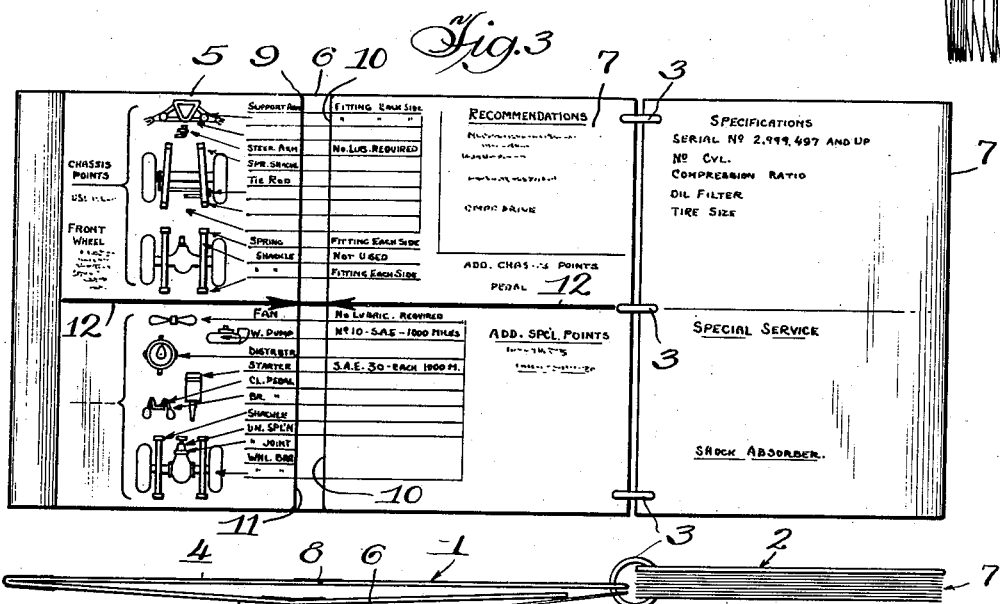
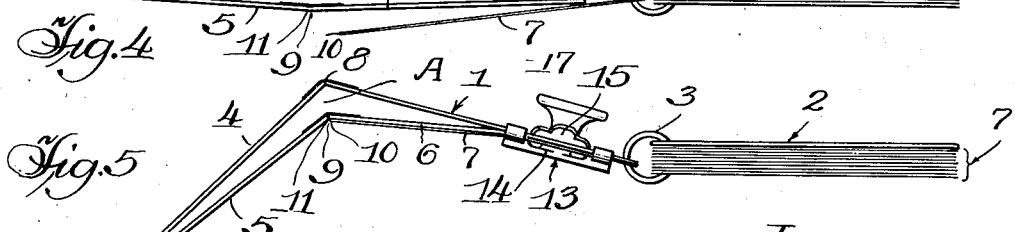
Inventor
Judson A. Purvis,
Parkinson & Lane, Attys Nov. 28, 1939.   J. A. PURVIS   2,181,588
SERVICE MANUAL OR GUIDE
Filed July 6, 1937   2 Sheets-Sheet 2
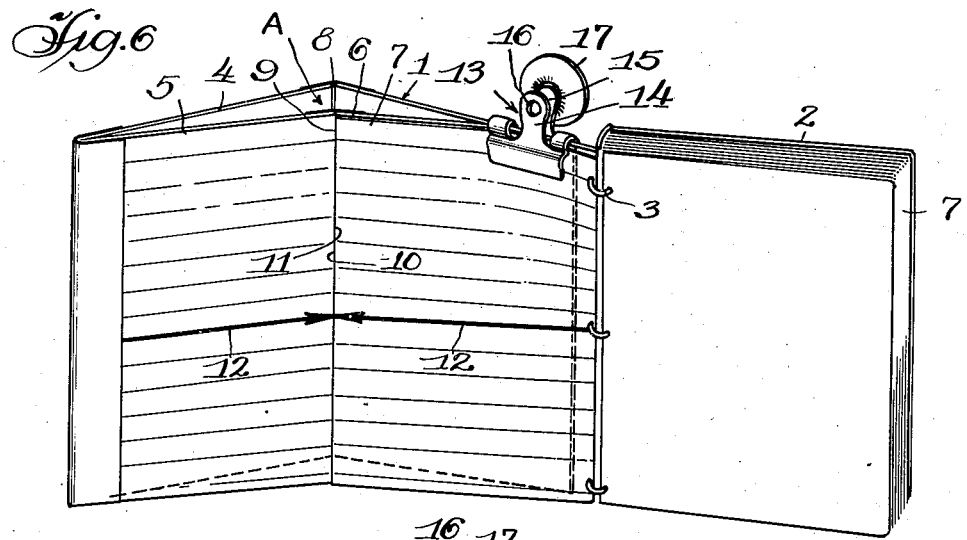
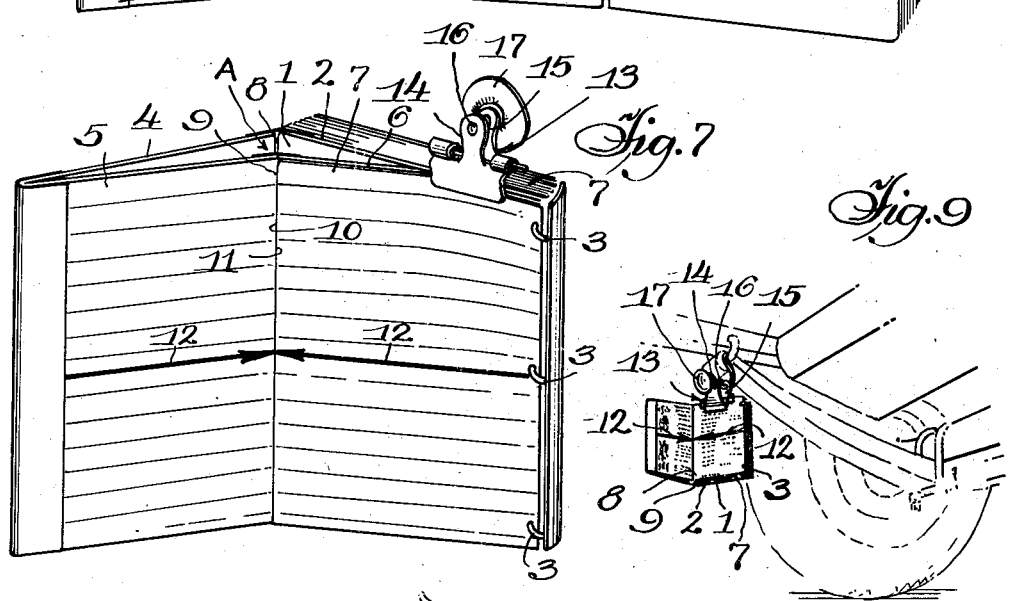
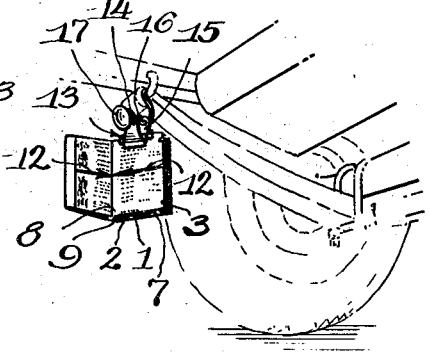
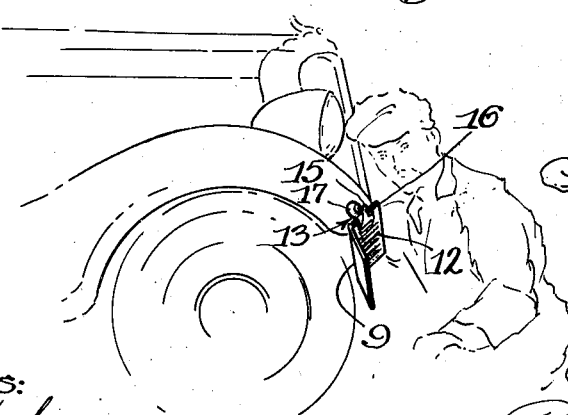
Inventor,
Judson A. Purvis,
Parkinson & Lane Attys.
Witness:
Chas. R. Koursh Patented Nov. 28, 1939

2,181,588

UNITED STATES PATENT OFFICE 2,181,588

SERVICE MANUAL OR GUIDE

Judson A. Purvis, Chicago, Ill.

Application July 6, 1937, Serial No. 152,025

3 Claims. (Cl. 35—54)

The present invention relates to a guide or manual and more particularly to a service manual adapted to convey the necessary information concerning the parts or operations of a vehicle requiring servicing.

Among the objects of the present invention is to provide a device in the form of a guide or manual containing the necessary information for completely servicing and lubricating or greasing the different parts of a vehicle, such as an automobile, tractor, airplane, truck or other automotive apparatus.

A further object is to provide a novel servicing manual in the form of a book or record having a chart disclosing common parts or operations and interleafed and aligned sheets or pages giving all the necessary information in a clear and concise manner concerning these parts or operations.

A still further object of the present invention is the provision of a novel lubricating and servicing guide or manual consisting of a master sheet or drawing disclosing, as a composite chart, the various parts or operations of a vehicle requiring servicing, and separate pages or sheets giving all the necessary information and lubrication instructions for the various parts and points of each model of the different manufacturers of automotive apparatus.

Another object is to provide a novel construction and arrangement of a servicing manual, with the sheets or pages and the information thereon so arranged and aligned as to make it available in the most practical and convenient form so that the chart and all desirable and necessary information for a particular model can be quickly co-ordinated and connected, and this requiring but a single composite chart, listing or diagram. This arrangement eliminates all necessity of a separate chart or diagram for each individual model and greatly reduces the cost of preparing such a book.

Still another object of the present invention is the provision of a novel means for supporting the guide or manual and in the novel compilation, arrangement and construction of the component parts thereof whereby the manual may be self-supporting or may be so placed or mounted upon or adjacent the vehicle being serviced that it is always accessible and in a most convenient location for ready reference by the mechanic.

Further objects are to provide a construction of maximum simplicity, efficiency, economy and ease of assembly, and such further objects, advantages and capabilities as will later more fully appear and as are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other details and constructions without departing from the spirit of the invention.

In the drawings:

Fig. 1 is a view in perspective of the novel manual.

Fig. 2 is a perspective view of the device in an open position.

Fig. 3 is a view in front elevation of the manual showing the position it occupies when lying on a flat surface, the manual being provided with one form of composite chart showing the various parts of a vehicle to be serviced, and the adjacent pages containing the necessary information in alignment therewith.

Fig. 4 is a top plan view of the manual.

Fig. 5 is a top plan view showing one arrangement of the parts when the manual is to be self-supported upon a horizontal surface.

Fig. 6 is a view in perspective of the manual in an open position.

Fig. 7 is a view similar to Fig. 6 but with a portion of the manual folded back.

Figs. 8 and 9 are views in perspective of the manual folded as in Fig. 7, and showing two methods of attaching it to an accessible part of an automobile or other vehicle.

Referring more particularly to the disclosure in the drawings, the novel device comprises a folder or manual which, in the disclosed and preferred embodiment, consists of a sectional backing or cover 1 and 2 hinged at 3 by any suitable rings or other attaching means. To this cover are hingedly connected sheets 4, 5 and 6 and a plurality of separate sheets or leaves 7. These sheets or leaves are provided with all the necessary or desirable information concerning the lubrication or servicing of all the various models of different manufacturers. The inside of each sheet or leaf is preferably lined and designated with all the necessary parts, servicing information and/or operations which material or data are adapted to be aligned with the master sheet or composite chart and information on sheet 5. This chart shows in a concise and composite manner, all the essential points or parts requiring lubrication or servicing on all of the various models of current automobiles. Each part on the chart is designated on a line or designation in alignment with a line or designation on the back of each sheet or leaf 7. On the front of a succeeding sheet or leaf is additional information concerning that particular model. Such information may include the specifications of that model, special services and other desirable data.

In order to make the manual self-supporting when placed on end as shown in Figs. 6 and 7, the sheets 5 and 6 are made narrower than the sheets 1 and 4 so that the vertical hinge 8 does not coincide with the hinge 9. Thus when the chart or master sheet is placed as in these figures with the edge 10 of sheet 7 coinciding with the edge 11 of sheet or chart 5 and the points of the arrows 12, 12 are in abutting relation, a space A is provided between the sheets 1 and 4, and 5 and 6, and which with the angular positioning of these sheets, gives the manual spaced points of support and makes it self-supporting.

To maintain the manual in a position for use and ready reference and the sheets and chart in alignment, where necessary, the invention comprehends a spring clip 13. This clip is shown as provided with projections 14 and 15 for opening the jaws of the clip, one of these projections having an opening 16 and the other having a vacuum cup 17 attached thereto. The opening 16 permits the manual to be hung in an open position upon any readily accessible hook, nail or other projection on or adjacent to the vehicle, while the vacuum cup 17 permits the manual to be suspended from any surface to which it may be attached.

It will be readily appreciated from the above disclosure that the invention fills a long felt want in the field of service manuals and is so constructed, arranged and combined as to provide a novel manual of information for ready reference. Although the disclosed embodiment of the invention is that of a lubricating or servicing manual or guide, it will be readily apparent that the disclosed arrangement is adapted for many and varied purposes where a composite chart, diagram or listing of data, parts or information common to a plurality of models or structures may be employed, with separate coordinating sheets bearing information adapted to align with the disclosure on the sheet bearing the chart.

Having thus disclosed the invention, I claim:

1. A guide for servicing vehicles of various makes and models having common parts and servicing operations, comprising a backing, a master chart pivoted to one edge of the backing and containing pictorial illustrations and designations of the chassis points and the special points requiring servicing that are common to the various makes and models, a series of sheets pivoted to another edge of the backing and each sheet being adapted to be folded upon the backing to abut the chart and containing detailed information concerning the fittings or parts and instructions relating to the parts to be lubricated on each of the various makes and models, and aligning means on the master chart and each of the sheets so that when a sheet is folded into abutting relation with the master chart, the detailed information and servicing instructions thereon become aligned with the illustrated parts and designations on the chart.

2. In a guide for servicing vehicles of various makes and models, a single master sheet containing a composite chart illustrating parts common to all said various makes and models and divided so as to show the separate chassis points and specialized points to be lubricated, and a plurality of sheets containing the desired information pertaining to each make and model and the parts referred to in the master sheet, including the fittings or parts specific to each model and the lubricant to be used in said fittings or parts, the servicing of the illustrations on the master sheet and the information on the plurality of sheets being arranged in alignment so that when the guide is opened and a specified sheet of a particular make and model is placed in alignment with the master sheet and upon the backing so as to abut the chart, the operator or mechanic is provided with the necessary or desirable information concerning the servicing of each fitting or part of the particular make and model.

3. A guide for servicing vehicles of various makes and models having common parts and servicing operations and so constructed and arranged as to be self-supporting, comprising a backing, a master chart containing pictorial illustrations and designations of the chassis and the other points requiring servicing that are common to the various makes and models, a series of leaves each adapted to be folded upon the chart and containing detailed information concerning the points to be serviced and instructions as to each of the various makes and models, the master chart being hinged to one edge of the backing, and the backing and chart being hinged intermediate their length, the chart and sheets being narrower than the backing so that when the parts of the backing and chart are arranged at an acute angle, the guide may be stood on end and is self-supporting, and means for maintaining the chart and desired leaf in registry.

JUDSON A. PURVIS.